3,133,958
LUBRICANT

Ronald L. Broadhead, Park Forest, Ill., assignor to Standard Oil Company, Chicago, Ill., a corporation of Indiana
No Drawing. Filed May 31, 1960, Ser. No. 32,573
4 Claims. (Cl. 260—475)

This invention relates to polyester resins having lubricating properties and ranging in condition at ordinary temperatures from fluids to semi-solid materials.

Much modern equipment requires lubricants possessing temperature stability and oxidation stability not attainable with the conventional hydrocarbon lubricating oils and hydrocarbon based greases. Particularly difficult situations arise with the greases because of the inability of the oil-base to maintain the thickener in suspension at high temperatures or high load conditions.

A class of polyesterification condensates has been discovered having lubricating properties and capable of being prepared to have a physical state at ordinary conditions ranging from free-flowing fluids to semi-solid solids and even thermo-plastic solids. These condensation reaction products are hereinafter referred to as lubricants. These lubricants are prepared by the condensation reaction of a monoester of a hereinafter defined saturated aliphatic monohydric alcohol and a benzene carboxylic acid or anhydride containing 3 or 4 carboxyl groups, with a glycol to obtain a product having an acid number of not more than about 30. (Acid number is the mg. KOH per g. of lubricant.) In addition to the glycol, there may be used either a benzene dicarboxylic acid or an alkanedioic acid. Said reactants are introduced into the condensation zone in hereinafter defined amounts.

The benzene polycarboxylic acid includes not only those having a single phenyl nucleus but also those having a diphenyl nucleus and also those having another group positioned between the two phenyl groups in the diphenyl nucleus.

The tricarboxylic acid present may be trimellitic acid, trimellitic anhydride, hemimellitic acid, hemimellitic anhydride, trimesic acid, benzophenone tricarboxylic acid, diphenyltricarboxylic acid, etc.

The benzene tetracarboxylic acid may be pyromellitic acid, pyromellitic dianhydride, a diphenyltetracarboxylic acid (anhydride), diphenylmethane tetracarboxylic acid (anhydride), benzophenone tetracarboxylic acid (anhydride), diphenylsulfone tetracarboxylic acid (anhydride), etc.

The benzene dicarboxylic acid may be one of the unsubstituted acids, i.e., phthalic acid, phthalic anhydride, isophthalic acid and terephthalic acid. Or alkyl substituted acid where the alkyl contains 1–8 carbon atoms, such as t-butylisophthalic acid, isooctylphthalic acid, dimethylterephthalic acid, methylphthalic anhydride. Or a halo substituted acid, such as, chlorophthalic acid, dichloroterephthalic acid, bromophthalic anhydride, and iodoisophthalic acid. Or diphenyldicarboxylic acid, benzophenone dicarboxylic acid, etc.

The alkanedioic acid contains from at least 4 carbon atoms to about 20 carbon atoms. Examples of suitable acids are succinic, glutaric, adipic, suberic, azelaic, sebacic, hexadecanedioic, and eicosanedioic. The alkanedioic acids containing from 6–10 carbon atoms are preferred.

One of the reactants is a saturated aliphatic monohydric alcohol containing at least 4 carbon atoms. When no dicarboxylic acid is present, the alcohol reactant contains not more than 16 carbon atoms. When a dicarboxylic acid is also present, the alcohol may contain up to 18 carbon atoms. Elements other than carbon, hydrogen, and oxygen may be present in the alcohol. Preferred substituents are the halogens, particularly fluorine and chlorine. Examples of suitable "C, H, O" alcohols are butanol, hexanol, n-octanol, decanol, undecanol, myristyl, cetyl, stearyl (1-octadecanol); the Oxo alcohols, isooctyl, nonyl, decyl, and tridecyl.

The glycol used in the preparation of the lubricant of the invention is an alkylene glycol containing from 2 to about 20 carbon atoms. It is to be understood that the term alkylene glycol includes not only those glycols containing only hydroxyl groups but also those including an ether linkage as well as hydroxyl groups. Exceptional results are obtained using the alkanediols containing from 2 to 8 carbon atoms. Illustrative glycols suitable for use in the invention are: ethylene glycol, propylene glycol, trimethylene glycol, tetramethylene glycol, pentamethylene glycol, hexamethylene glycol, heptamethylene glycol, octamethylene glycol, nonamethylene glycol, decamethylene glycol, undecamethylene glycol, 1,3-butanediol, 2,3-butanediol, 2,4-pentanediol, 2-methyl-2,4-pentanediol, 2,3-dimethyl-2,3-butanediol, 2,2-diethyl-1,3-propanediol, 2-ethyl-1,3-hexanediol, 2-ethyl-2-butyl-1,3-propanediol, diethylene glycol, triethylene glycol, tetraethylene glycol, dipropylene glycol, and tripropylene glycol.

The monoester may be a preformed compound or may be made in situ. When the monoester is formed from the acidic member and an alcohol, the acidic member: alcohol reaction charge is in a mole ratio from about 1:0.9 to about 1:1.1 and preferably an equimolar ratio.

The acidic member and the alcohol are vigorously agitated and the reaction carried out at a temperature below about 120° C.—this is in order to avoid formation of diesters and triesters. Generally the monoester reaction is carried out at a temperature from about 80° C. to 120° C., and more usually from about 100° C.– 115° C.

In any event, sufficient glycol is introduced into the condensate zone to react with the free-carboxyl groups present therein. An excess of glycol is preferred. In general, the glycol is charged in an amount such that the hydroxyl groups charged are from about 105% to about 130% of the free-carboxyl groups present. The term "free-carboxyl groups" includes the unreacted carboxyl groups in the monoester introduced into or prepared in the reaction zone and the carboxyl groups present on the dicarboxylic acid introduced when dicarboxylic acid is also used in the preparation of the lubricant.

The benzene dicarboxylic acid, when present, is charged to the condensation zone in an amount not more than 1 mole of the defined acidic member, i.e., benzene carboxylic acid containing 3–4 carboxyl groups. When this benzene dicarboxylic acid is present, it is preferred that the amount present be from 0.2 to not more than 1 mole per mole of the acidic member. The particular amount used is dependent upon the properties desired in the final lubricant product.

When the defined alkanedioic acid is present in the condensation zone it is present in an amount not more than 2.3 moles per mole of the defined acidic member. When present, the alkanedioic acid is preferably present in an amount from 0.3 to not more than 2.3 moles of said acidic member.

Lubricants may be prepared which contain both benzene dicarboxylic acid and alkanedioic acid. In such a situation the amounts of the two dicarboxylic acids present in the condensation zone are determined relative to the ratios set out hereinbefore when only one of the acids is present.

The condensation reaction is carried out under more or less conventional conditions for polyesterification-condensation reactions. The reaction zone is vigorously agitated to improve contacting while the temperature is maintained between about 125° C. and 225° C., commonly on the order of 170° C. Water produced in the reaction is continuously withdrawn. The time of reaction is determined by the type of reactants and the temperature of reaction; the lubricant product has an acid number of not more than about 30.

EXAMPLES

The preparation of lubricants of the invention is illustrated: In an ordinary beaker equipped with a propeller stirrer, trimellitic anhydride and a stearyl alcohol were reacted at a temperature over the range of 90–120° C. At the beginning the beaker contained a slurry of solid anhydride particles in the liquid alcohol, at the end, the beaker contained a pasty solid of monoester.

This monoester and neopentyl glycol (plus dicarboxylic acid when used) were condensed in a flash fitted with a reflux condenser and equipped with an agitator and a water-trap, at 175°–225° C. for the time needed to obtain desired or a relatively constant acid number.

*Example 1*

67.4 grams (0.35 mole) of trimellitic anhydride and 86.0 grams of 1-octadecanol (0.35 mole) were heated together at 95–100° C. for two hours and 20 minutes. Then, 62.5 grams neopentyl glycol (0.60 mole) and 30.3 grams of sebacic acid (0.15 mole) were added and the charge temperature raised to 155° C. in 60 minutes and held at 155–165° C. for 2¾ hours and then cooked for 7 hours at 165–175° C. The product was soft and greasy. Acid number about 20.

*Example 2*

Monomyristyl trimellitate, 40.6 grams (0.10 mole); neopentyl glycol, 41.7 grams (0.40 mole); and sebacic acid, 40.4 grams (0.20 mole) were heated together under reflux with a water-removed trap for 16 hours. Acid number of product was 20.5. This product was almost fluid at room temperature. That is, when the room temperature went up to about 27° C. the product became quite fluid.

*Example 3*

46.25 grams monooctadecyl trimellitate (0.10 mole), 36.50 grams neopentyl glycol (0.35 mole), and 29.20 grams adipic acid (0.20 mole) were heated together for 1¾ hours at 170–180° C. The temperature was then raised to 223° C. and held at 223–240° C. for 3½ hours. Acid number of the soft greasy product was 6.5.

*Example 4*

46.25 grams monooctadecyl trimellitate (0.10 mole), 8.3 grams isophthalic acid (0.05 mole), and 20.8 grams neopentyl glycol (0.20 mole) were heated together at 218–230° C. for 4 hours and 40 minutes. The resulting product was a soft resinous product with a waxy, greasy character, of acid number of 9.

ILLUSTRATION 5

Monooctadecyl trimellitate, 1 mole, was condensed with 1.25 moles of neopentyl glycol to obtain a pale tan waxy solid with an acid number of 25.

*Example 5*

Monohexadecyl trimellitate, 1 mole, was condensed with 1.25 moles of neopentyl glycol. The product was a semi-solid material having a greasy appearance and an acid number of about 25. (Illustration 5 and Example 5 show the sharp difference in physical properties obtained in a shift of only two carbon atoms present in the monohydric alcohol used to prepare the monoester when no dicarboxylic acid is present.)

*Example 6*

Monohexadecyl trimellitate, 1 mole, was condensed with 1,4-butanediol. The product was a soft semi-solid material resembling a grease. This material was softer than the material obtained at Example 5.

The lubricants of the invention may be used for lubricating purposes alone. Or they may be used in admixture with hydrocarbon oils or other synthetic lubricants. The semi-solid materials may be used as thickeners for hydrocarbon oils to prepare grease-like materials or with other synthetic oils to prepare grease-like materials.

Thus having described the invention, what is claimed is:

1. A lubricant consisting essentially of the condensation reaction product of (A) a monoester of (i) an acidic member selected from the class consisting of benzene carboxylic acids having 3 carboxyl groups and anhydrides thereof and (ii) a saturated aliphatic C, H, O monohydric alcohol of from at least about 4 to not more than 18 carbon atoms, said monoester having a mole ratio of said acidic member to said alcohol of from about 1:0.9 to about 1:1.1, and (B) an alkylene glycol of from 2 to about 20 carbon atoms and at least one dicarboxylic acid selected from the class consisting of (a) benzene dicarboxylic acid and (b) alkanedioic acid of from 4 to about 20 carbon atoms, and (c) mixtures thereof, said benzene dicarboxylic acid being present in an amount from "zero" to not more than 1 mole per mole of said acidic member, said alkanedioic acid being present in an amount from "zero" to not more than 2.3 moles per mole of said acidic member, when said benzene dicarboxylic acid is "zero" then the amount of said alkanedioic acid is at least 0.3, when said alkanedioic acid is "zero" then the amount of said benzene dicarboxylic acid is at least 0.2, and mixtures of said dicarboxylic acids being present in relative amounts based on said hereinbefore set out ratios, said glycol being present in an amount to react with the free-carboxyl groups present, with continuous withdrawal of water of reaction until condensation reaction is essentially complete, to obtain a lubricant product having an acid number of not more than about 30.

2. A semi-solid lubricant consisting of the condensation reaction product of mono-1-octadecyl trimellitate, about 1 mole; neopentyl glycol, about 1.7 mole; and sebacic acid, about 0.4 mole, having an acid number of about 20.

3. A fluid lubricant consisting of the condensation reaction product of monomyristyl trimellitate, about 1 mole; neopentyl glycol, about 4 moles; and sebacic acid, about 2 moles, having an acid number of about 20.

4. A semi-solid lubricant consisting of the condensation reaction product of mono-1-octadecyl trimellitate, about 1 mole; neopentyl glycol, about 1.25 moles; and isophthalic acid, about 0.5 mole, having an acid number of about 9.

References Cited in the file of this patent

UNITED STATES PATENTS

| | | |
|---|---|---|
| 1,951,593 | Bradley | Mar. 20, 1934 |
| 2,937,996 | Pethrick et al. | Mar. 24, 1960 |